United States Patent

Ko et al.

Patent Number: 5,905,664
Date of Patent: May 18, 1999

[54] CIRCUIT FOR DETERMINING, IN PARALLEL, THE TERMS OF A REMAINDER THAT RESULTS FROM DIVIDING TWO BINARY POLYNOMIALS

[75] Inventors: Eugene Ko, Milpitas; Juin-Yeu Joseph Lu, Santa Clara, both of Calif.

[73] Assignee: National Semiconductor Corp., Santa Clara, Calif.

[21] Appl. No.: 08/832,986

[22] Filed: Apr. 4, 1997

[51] Int. Cl.[6] .................. G06F 7/38; G06F 7/00
[52] U.S. Cl. ........................ 364/746; 364/746.1
[58] Field of Search ................. 364/746, 746.1, 364/761

[56] References Cited

U.S. PATENT DOCUMENTS

| | | | |
|---|---|---|---|
| 5,367,479 | 11/1994 | Van Der Putten | 364/761 |
| 5,379,243 | 1/1995 | Greenberger et al. | 364/746.1 |
| 5,778,009 | 7/1998 | Fredrickson et al. | 371/37.1 |
| 5,818,855 | 10/1998 | Foxcroft | 371/37.8 |

OTHER PUBLICATIONS

"ATM User–Network Interface Specification", Ver. 3.0, Sep. 10, 1993, PTR Prentice Hall, pp. 12–47.

*Primary Examiner*—Tan V. Mai
*Attorney, Agent, or Firm*—Limbach & Limbach L.L.P.

[57] ABSTRACT

A circuit that determines the remainder of a modulo 2 polynomial division in just one clock cycle. Specifically, each term of the remainder is determined in parallel with each other term of the remainder. The circuit includes a network of XOR devices to determine $H(X)=P(X)$ mod $G(X)$, where $P(X)$ is a first binary polynomial, of a form: $a_m X^m + a_{m-1} X^{m-1} 30 \ldots + a_0$, where $a=\{0,1\}$ and $X=\{0,1\}$; $G(X)$ is a second binary polynomial, of a form: $a_n X^n + a_{n-1} X^{n-1} + \ldots + a_0$, where $a=\{0,1\}$ and $X=\{0,1\}$, and $m>n$; and $H(X)$ is a third binary polynomial, of a form: $b_p X^p + b_{p-1} X^{p-1} + \ldots + _0$. The configuration of the network of XOR devices is determined by reducing terms of the first binary polynomial to have only terms having less than the degree of the second binary polynomial. Then, for each term of the third binary polynomial (i.e., the remainder), it is determined which reduced terms of the first binary polynomial affect it. From this determination, the configuration of sub-networks of XOR devices is determined.

14 Claims, 4 Drawing Sheets

FIG. 5

Parallel Modulo Model in SMV h0 := !(a8 = !(a14 = !(a15 = !(a16 = !(a20 = !(a22 = !(a24 = !(a26 = !(a27 = !(a29 = !(a31 = !(a36 = !(a38 = a39))))))))))));

h1 := !(a8 = !(a9 = !(a14 = !(a17 = !(a20 = !(a21 = !(a22 = !(a23 = !(a24 = !(a25 = !(a26 = !(a28 = !(a29 = !(a30 = !(a31 = !(a32 = !(a36 = !(a37 = a38))))))))))))))))));

h2 := !(a8 = !(a9 = !(a10 = !(a14 = !(a16 = !(a18 = !(a20 = !(a21 = !(a23 = !(a25 = !(a30 = !(a32 = !(a33 = !(a36 = a37))))))))))))); . . .

Serial Modulo Model in SMV

ASSIGN
init(state) := 0;
next(state) := case
    state = 32 : 32;
    state < 32 : state + 1;
esac;
init(x7) := a39;
next(x7) := case
    state >= 32 : X7;
    (state < 31) & !(x7 = 0) : !(x6 = div7);
    (state < 31) & (x7 = 0) : x6;
    (state = 31) & !(x7 = 0) : !(x6 = div7);
    (state = 31) & (x7 = 0) : x6;
esac;
init(x6) := a38; ...
next(x6) := case ...

Relationship between the Parallel and the Serial Model

SPEC
AG (state = 32 -> AX state = 32)
SPEC
AG (state = 32 -> x0 = h0)
SPEC
AG (state = 32 -> x1 = h1)
SPEC
AG (state = 32 -> x2 = h2)
SPEC
AG (state = 32 -> x3 = h3)
SPEC
AG (state = 32 -> x4 = h4)
SPEC
AG (state = 32 -> x5 = h5)
SPEC
AG (state = 32 -> x6 = h6)
SPEC
AG (state = 32 -> x7 = h7)

CIRCUIT FOR DETERMINING, IN PARALLEL, THE TERMS OF A REMAINDER THAT RESULTS FROM DIVIDING TWO BINARY POLYNOMIALS

TECHNICAL FIELD

The present invention relates to a circuit for determining the terms of a remainder that results from dividing two binary polynomials. In particular, the invention relates to a circuit that determines the terms of the remainder in parallel.

BACKGROUND

Division of binary polynomials has application in transmits data via ISDN, in particular, for generating header error codes from input code vectors. Specifically, section 4.3 ("Header error control") of ITU-T Recommendation 1.432 discusses that an input code vector consisting of ones and zeros can be represented by a polynomial. For example, the code vector 1000000100001 can be represented by the polynomial $$P(x)=x^{12}+x^5+1.$$

According to the ITU-T Recommendation, the header control (HEC) field "shall be the remainder of the division (modulo 2) by the generator polynomial $$x^8+x^2+x+1$$

of the product $x^8$ multiplied by the content of the header excluding the HEC field."

Conventionally, in order to determine the remainder of the above-mentioned modulo 2 division, a linear switching circuit is employed. Such linear switching circuits are well-known in the art and are described, for example, in Chapter 7 (pp. 170–178) of Error-Correcting Codes (Second Edition), published by the Massachusetts Institute of Technology in 1972, and authored by W. Wesley Peterson and E. J. Weldon. A disadvantage of using linear switching circuits for polynomial division is that these linear switching circuits require as many clock cycles to complete the division as the degree of the polynomial divisor.

SUMMARY

The present invention provides a circuit that determines the remainder of a modulo 2 polynomial division in just one clock cycle. Specifically, each term of the remainder is determined in parallel with each other term of the remainder.

The circuit includes a network of XOR devices to determine $H(X)=P(X) \bmod G(X)$, where P(X) is a first binary polynomial, of a form $$a_m X^m + a_{m-1} X_{m-1} + \ldots + a_0,$$

where $a=\{0,1\}$ and $X=\{0,1\}$;

G(X) is a second binary polynomial, of a form $$a_n X^n + a_{n-1} X^{n-1} + \ldots + a_0,$$

where $a=\{0,1\}$ and $X=\{0,1\}$, and m>n; and

H(X) is a third binary polynomial, of a form $b_p X^p + b_{p-1} X^{p-1} + \ldots + b_0$, the circuit comprising:

The configuration of the network of XOR devices is determined in accordance with the steps of:

a) for each separate term of the first binary polynomial having a degree j, for $j \geq n$, a1) factoring out $X^n$;

a2) multiplying the terms that remain in the separate term, after $X^n$ has been factored out, by $a_{n-1}X^{n-1} + \ldots + a_0$;

a3) repeating steps a1) and a2) until there is no remaining term in the separate term having a degree $\geq n$;

a4) setting the result of the last execution of step a2), for the separate term, as a reduced formulation for the separate term;

b) for i=0 to n-1, b1) determining, for each term of the first binary polynomial having a degree j, for $j \geq n$, whether the reduced formulation for the term includes a term $X^i$ having a non-zero coefficient;

b2) configuring a network of XOR devices to generate a signal that represent the XOR of $X^i$ and all $X^j$ determined in step b1).

BRIEF DESCRIPTION OF DRAWINGS

FIG. 5 illustrates a simulation for use in the FIG. 4 process.

DETAILED DESCRIPTION

Figure 1:
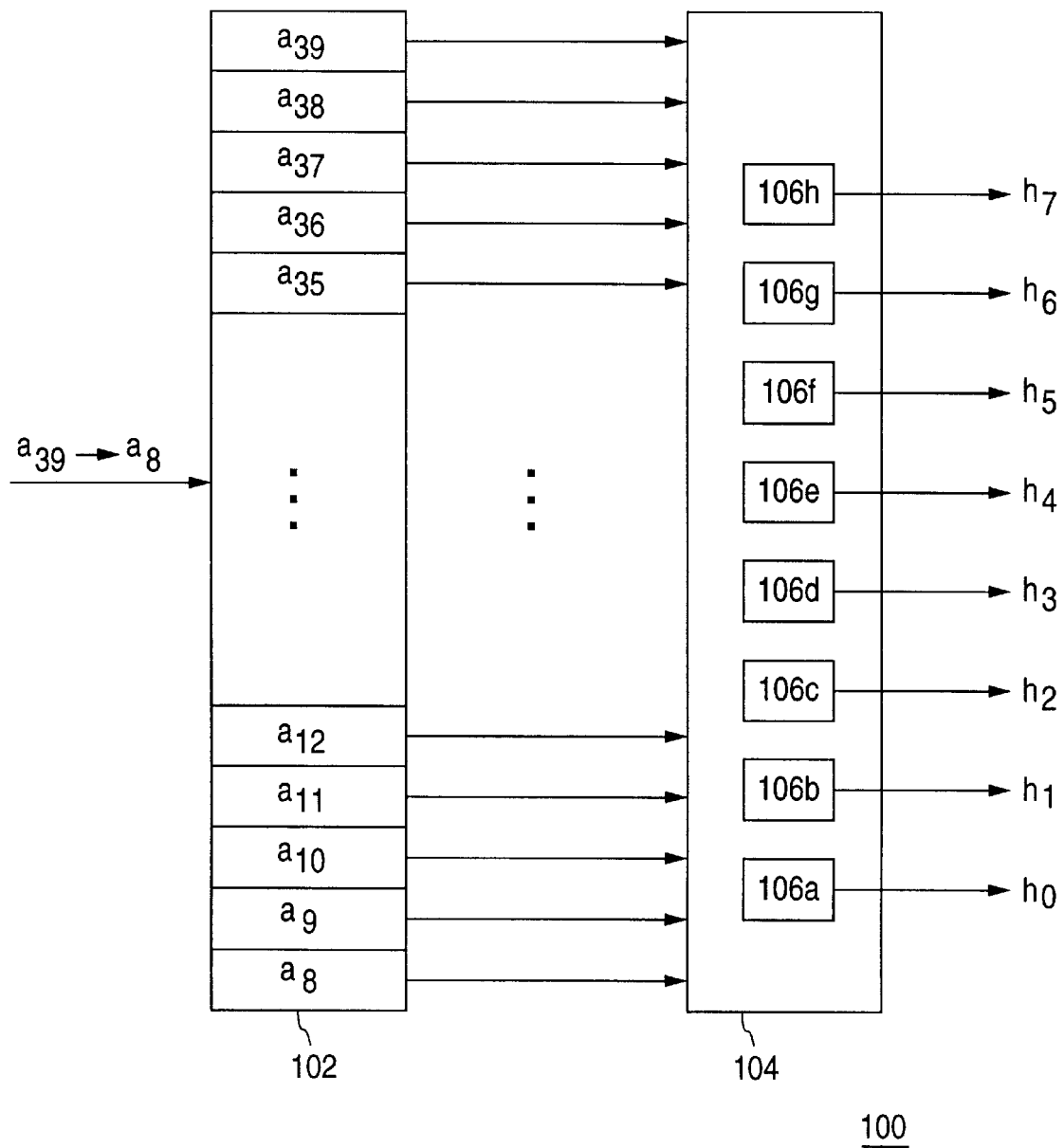
FIG. 1 illustrates, in block form, a circuit in accordance with an embodiment of the invention.

FIG. 1 schematically illustrates a circuit 100 for receiving the bits of a code vector having coefficients $a_{39}$ through $a_8$ and determining the remainder of dividing the code vector by a degree 8 generator polynomial. It is assumed that the coefficients $a_7$ through $a_0$ are a priori determined to be zero and, thus, there is no input for providing them to the circuit 100. In general, all non-zero coefficients of the code vector are provided to the circuit 100 and any coefficients that are a priori determined to be zero need not be provided to the circuit 100.

A register bank 102 is provided for holding the coefficients of the code vector. The coefficients are provided to a network 104 of XOR devices. The network 104 includes a plurality of sub-networks 106a through 106h of XOR devices. Each of the sub-networks receives some or all of the coefficients from the register bank 102 and generates an output that is the XOR of the received coefficients. The output of each sub-network of XOR devices is the coefficient of a term of a header error control function, as represented by a remainder function. That's in general terms, the input code vector is represented by an input binary polynomial A(X). A generator polynomial is B(X). The remainder function H(X) is Rem(X), where A(X)/B(X)=Q(X)+Rem(X)/B(X). It is significant that each term of the remainder H(X) is determined in parallel with each other term. Thus, the header error control field can be determined in a single clock cycle.

Figure 2:
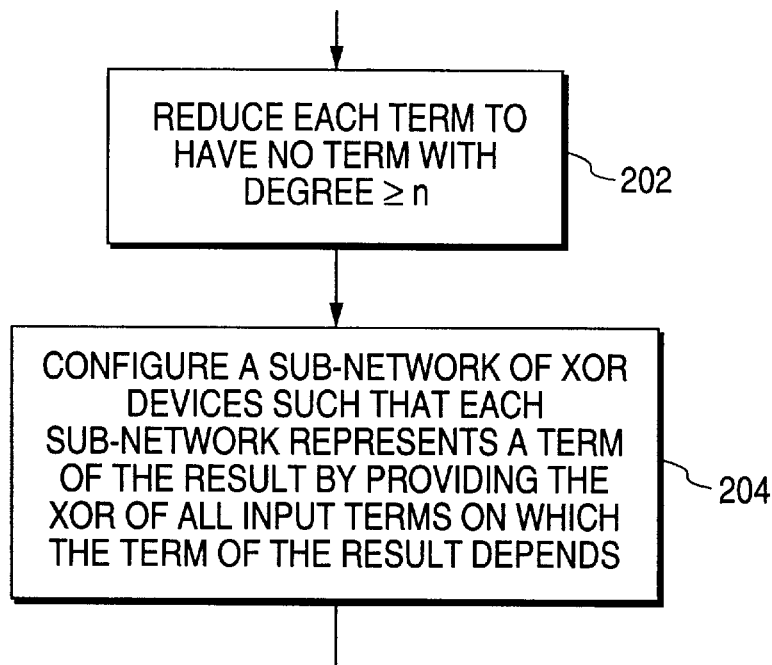
FIG. 2 is a flowchart that illustrates an overall process for determining how the subnetworks of XOR devices are configured.
Figure 3:
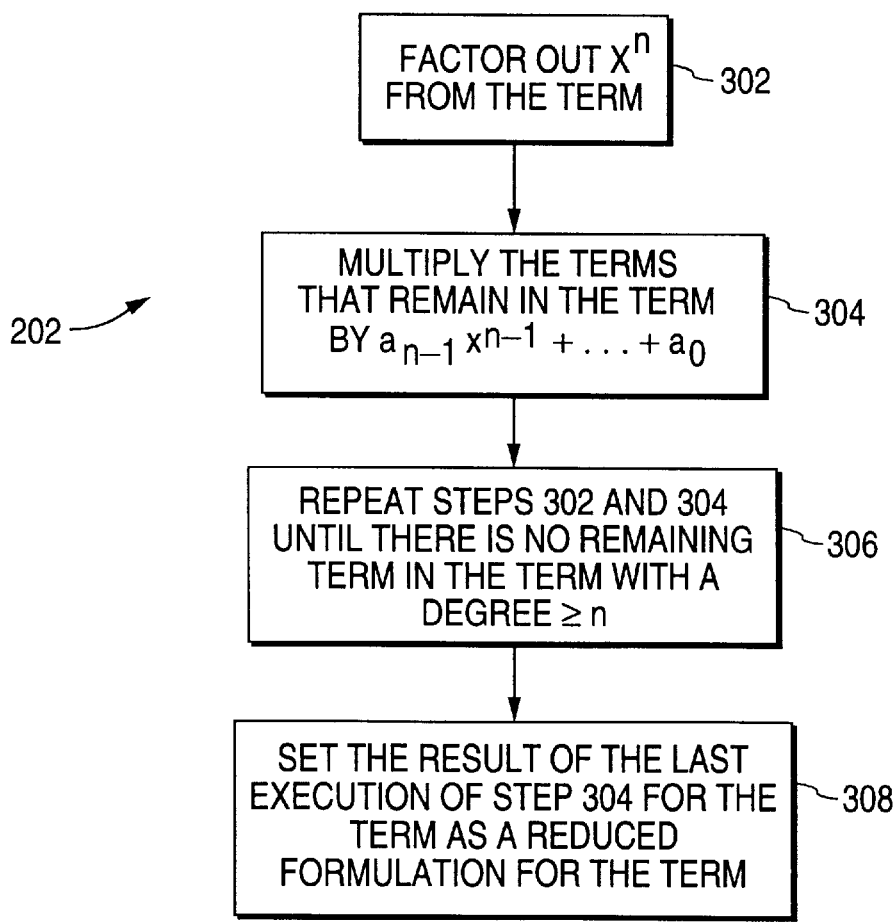
FIG. 3 is a flowchart that illustrates the term reduction step of the FIG. 2 flowchart.

The configuration of the sub-networks 106a through 106h may be determined by the method illustrated in flowchart form in FIGS. 2 and 3. The method will be discussed by way of an example. But, first, some properties of binary finite fields in general are discussed.

A binary finite field has the following properties:

1. There are two operations: addition and multiplication.

2. The result of any combination of an addition and multiplication operations is always an element that is contained in the binary finite field.
3. For every element e beside 0, there exists an additive inverse element (−e) and a multiplication inverse element ($e^{-1}$) such that (e)+(−e)=0 and $e*e^{-1}=1$. The element $0^{-1}$ does not exist.
4. For any element e, the binary finite field contains the additive identity 0 and the multiplication identity 1 such that e+0=e and e*1=e.
5. For any element e, e+e=0 and (−e)=e.
6. The distributive property applies to binary finite fields. The following theorem holds for binary finite fields:

Theorem 1: If $G(X)=a_n X^n + a_{n-1} X^{n-1} + \ldots + a_0$, where $a=\{0,1\}$ and $X=\{0,1\}$, then $X^n = a_{n-1} X^{n-1} + \ldots + a_0$.

Proof of Theorem 1:

$G(X)=0$ (modulo by $G(X)$).

Apply property 5. $G(X)=g(x)+g(x)=0$.

Let $g(x)=X^n$, then $X^n = a_{n-1} X^{n-1} + \ldots + a_0$.

A simple example will illustrate how to configure sub-networks of XOR devices to obtain the remainder $H(X)=P(X)/G(X)$ that represents the Header Error control field, where P(X) represents the input code vector and is equal to $X^4 + X^3 + X + X^0$ and where G(X) is the generator polynomial and is equal to $X^3 + X + X^0$. It can be seen that the highest degree, "n", of G(X) is 3.

As shown in step 202 of FIG. 2, each term of the polynomial input code vector polynomial P(X) that has a degree greater than or equal to "n" is reduced to have no term with degree greater than or equal to "n".

Referring to the example, only two terms of P(X) have degree greater than or equal to 3. The $X^3$ term is reduced to $X^0 + X$ by applying Theorem 1 discussed above. The $X^4$ term is first reduced to $X^3(X)$ in step 302 of the FIG. 3 flowchart. Then, at step 304, X (the remaining term after $X^3$ is factored out) is multiplied by $X + X^0$ to yield $X + X^2$. At this point, all terms of the reduced formulation for $X^3$ are less than n, so there is nothing to repeat at step 306. Thus, at step 308, $X + X^2$ is set as the reduced formulation for the $X^4$ term of the input code vector.

Now, step 204 of the FIG. 2 flowchart is discussed. It can be seen that the $X^0$ and $X^3$ terms of the polynomial input code vector have contribution to the $X^0$ term of the polynomial output Header Error control field. Similarly, the $X^1$, $X^3$ and $X^4$ terms of the polynomial input code vector have contribution to the $X^1$ term of the polynomial output Header Error control field. The $X^4$ term of the polynomial input code vector has contribution to the $X^2$ term of the polynomial output Header Error control field vector.

Thus, the sub-networks of XOR devices are configured as follows to provide outputs that represent the terms of the Header Error control field vector:

$h_0(X)=X^0$ xor $X^3$;

$h_1(X)=X^1$ xor $X^3$ xor $X^4$; and $h_2(X)=X^4$.

For any arbitrary input code vector of degree "n", unless particular terms are a priori determined to have zero coefficients, then all terms must be accounted for in configuring the sub-networks of XOR devices, For example, using the example of the 39-degree input code vector discussed previously, all terms having degree 7 through 0 are a priori determined to be 0. However, the coefficients of the terms having a degree greater than 7 (i.e., 8 to 39) are arbitrary and must be accounted for in configuring the sub-networks of XOR devices for determining the term of the header error control code.

In some cases, it may be desirable to split the computation of coefficients into two or more cycles. Common circuit elements could be utilized, with the input, provided to the circuit elements in a multiplexed fashion.

For example, for a general 39-degree polynomial, with terms having degree 7 and lower a priori determined to be 0, divided by $X^8 + X^2 + X + 1$, as provided for in the ITU-T Recommendation, the coefficients of the header control field are determined to be:

$h_7 = (a_{13}$ xor $a_{14}$ xor $a_{15}$ xor $a_{19}$ xor $a_{21}$ xor $a_{23})$ xor $(a_{25}$ xor $a_{26}$ xor $a_{28}$ xor $a_{30}$ xor $a_{35}$ xor $a_{37}$ xor $a_{38})$ $h_6 = (a_{12}$ xor $a_{13}$ xor $a_{14}$ xor $a_{18}$ xor $a_{20}$ xor $a_{22})$ xor $(a_{24}$ xor $a_{25}$ xor $a_{27}$ xor $a_{29}$ xor $a_{34}$ xor $a_{36}$ xor $a_{37})$ $h_5 = (a_{11}$ xor $a_{12}$ xor $a_{13}$ xor $a_{17}$ xor $a_{19}$ xor $a_{21}$ xor $a_{23})$ xor $(a_{24}$ xor $a_{26}$ xor $a_{28}$ xor $a_{33}$ xor $a_{35}$ xor $a_{36}$ xor $a_{39})$ $h_4 = (a_{10}$ xor $a_{11}$ xor $a_{12}$ xor $a_{16}$ xor $a_{18}$ xor $a_{20\ xor\ a22}$ xor $a_{23})$ xor $(a_{25}$ xor $a_{27}$ xor $a_{32}$ xor $a_{34}$ xor $a_{35}$ xor $a_{38}$ xor $a_{39})$ $h_3 = (a_9$ xor $a_{10}$ xor $a_{11}$ xor $a_{15}$ xor $a_{17}$ xor $a_{19}$ xor $a_{21}$ xor $a_{22})$ xor $(a_{24}$ xor $a_{26}$ xor $a_{31}$ xor $a_{33}$ xor $a_{34}$ xor $a_{37}$ xor $a_{38})$ $h_2 = (a_8$ xor $a_9$ xor $a_{10}$ xor $a_{14}$ xor $a_{16}$ xor $a_{18}$ xor $a_{20}$ xor $a_{21}$ xor $a_{23})$ xor $(a_{25}$ xor $a_{30}$ xor $a_{32}$ xor $a_{33}$ xor $a_{36}$ xor $a_{37})$ $h_1 = (a_8$ xor $a_9$ xor $a_{14}$ xor $a_{17}$ xor $a_{20}$ xor $a_{21}$ xor $a_{22}$ xor $a_{23}$ xor$)$ xor $(a_{24}$ xor $a_{25}$ xor $a_{26}$ xor $a_{28}$ xor $a_{29}$ xor $a_{30}$ xor $a_3$, xor $a_{32}$ xor $a_{36}$ xor $a_{37}$ xor $a_{38})$ $h_0 = (a_8$ xor $a_{14}$ xor $a_{15}$ xor $a_{16}$ xor $a_{20}$ xor $a_{22})$ xor $(a_{24}$ xor $a_{26}$ xor $a_{27}$ xor $a_{29}$ xor $a_{31}$ xor $a_{36}$ xor $a_{38}$ xor $a_{39})$ By dividing the XOR computations as denoted by the parenthesis in each "h" term, the computation can be performed with half the number of XOR devices, albeit in twice the number of clock cycles.

Figure 4:
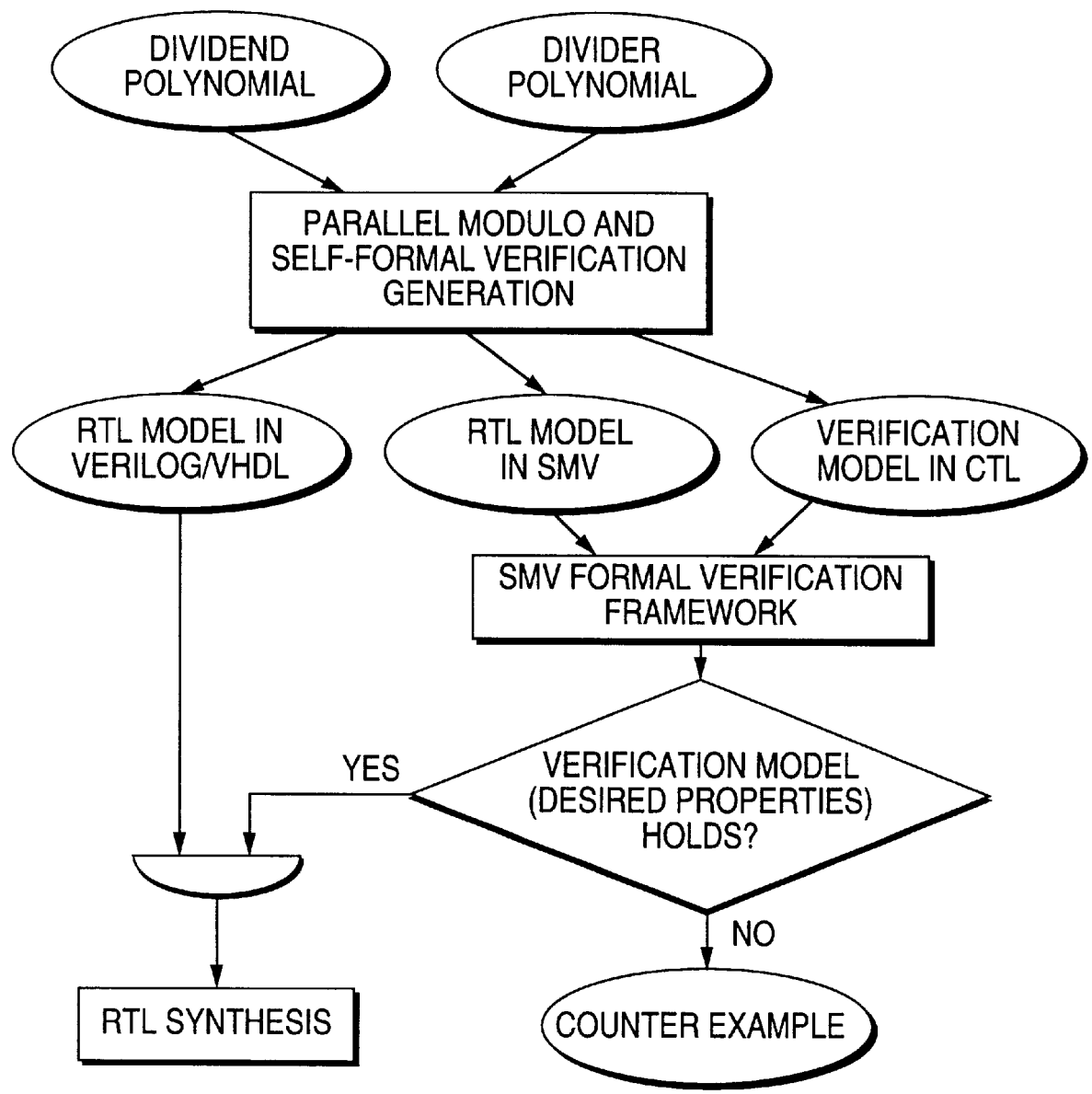
FIG. 4 is a flowchart that illustrates a process for verifying the FIG. 1 circuit.

Based on the theory and algorithm discussed above a Register-Transfer Level (hereinafter referred to as "RTL") model generator for general n-degree parallel polynomial modulo can be developed. The generator includes three portion: 1) Verilog/Very High Speed IC Harware Description Language (hereinafter referred to as "VHDL") RTL model generator, 2) Symbolic Model Verifier (hereinafter referred to as "SMV") model generator, and 3) Formal verification model generator. The output of Verilog/VHDL generator is fed to RTL synthesis tools for chip synthesis. The RTL model in SMV language and the formal verification model are fed into the formal verification framework. The SMV carries out a formal proof of the functionality of the generated circuit. The self-formal verification flow is shown in FIG. 4.

SMV is a tool for checking finite state systems against temporal logic specifications. The input language of SMV is designed to describe finite state systems ranging from synchronous, asynchronous, detail to abstract. Temporal logic is a system for describing about system behavior changes in time. Two types of temporal logic exists—linear time and branching time. In the linear time approach, the overall behavior of a system is represented by all feasible behavior sequences. In the branching time approach, the behavior of a system is considered as infinite behavior trees. In the SMV system, the latter approach is taken and is referred as Computation Tree Logic (CTL). In CTL, the specification is described as formula (which is the extension of the linear time temporal logic with computation path quantifiers and the implementation is represented as a state-transition graph). The verification process in the SMV system is carried out by a model checker, which determines the truth of the temporal formula, along the computation paths, with respect to the state-transition graph). For example, 1. for all path, whenever event x happens event y eventually (or several cycles later) happens, 2. for all path, event x never happens, 3. for all path, event x and event y never happen simultaneously, etc.

In the polynomial modulo verification, the specification describing the desired functionality is expressed as shown above in option number 1.

In general, the verification for observable behaviors can be done by simulation or formal methods. For those non-observable behaviors, they can only be verified by formal methods. SMV can be used to verify for observable behaviors as well as non-observable behaviors. Nonobservable behaviors include deadlock freedom, "never happen", detection of unreachable states, etc.

The formal verification model generation procedure produces CTL models describing the desired functionality for the parallel modulo, the corresponding serial modulo and relationship between the two. The basic concepts about the verification model is to relate the behavior of the parallel and the serial modulo (LFSR) in time.

For the example of describes a 39-degree polynomial modulo by a 7-degree polynomial, the CTL model states that for all computation paths, all the outputs of the parallel modulo at the 0th cycle are equivalent to that of the serial modulo at the 32nd cycle. The RTL generation and formal verification process may be automated as shown in FIG. 4. The automated methodology consists of three steps: 1) the designer provides two parameters which are the dividend and divisor polynomials, 2) the model generator generates an RTL parallel model in Verilog or VHDL hardware description language and an associated formal self-verification model in which the desired functionality is stated, and 3) the formal self-verification model is fed into the SMV formal verification frame work to check if the generated parallel modulo preserves the desired properties (functionality). IF the verification failed, the verification framework produces counter vectors indicating where the parallel model is incorrect.

Thus, a circuit for generating generic n-degree high-speed parallel polynomial modulos, and an automated RTL model generation and self-formal verification methodology have been described. The automated formal verification procedure reduces the verification complexity and shortens the cycle time greatly.

What is claimed is:

1. A circuit that determines $H(X)=P(X) \bmod G(X)$, where $P(X)$ is a first binary polynomial, of a form $$a_m X^m + a_{m-1} X^{m-1} + \ldots + a_0,$$

where $a=\{0,1\}$ and $X=\{0,1\}$;

$G(X)$ is a second binary polynomial, of a form $$a_n X^n + a_{n-1} X^{n-1} + \ldots + a_0,$$

where $a=\{0,1\}$ and $X=\{0,1\}$, and m>n; and $H(X)$ is a third binary polynomial, of a form $b_p X^p + b_{p-1} X^{p-1} + \ldots + b_0$, the circuit comprising:

a network of XOR devices, wherein a configuration of the network of XOR devices is determined in accordance with the steps of:

a) for each separate term of the first binary polynomial having a degree j, for $j \geq n$, a1) factoring out $X^n$;

a2) multiplying the terms that remain in the separate term, after $X^n$ has been factored out, by an $X^{n-1} + \ldots + a_0$;

a3) repeating steps a1) and a2) until there is no remaining term in the separate term having a degree $\geq n$;

a4) setting the result of the last execution of step a2), for the separate term, as a reduced formulation for the separate term;

b) for i=0 to n-1, b1) determining, for each term of the first binary polynomial having a degree j, for $j \geq n$, whether the reduced formulation for the term includes a term $X^i$ having a non-zero coefficient;

b2) configuring a network of XOR devices to generate a signal that represent the XOR of $X^i$ and all $X^j$ determined in step b1).

2. The circuit of claim 1, wherein steps a) and b1) are performed only for each separate term of the first binary polynomial having a degree j, for $j \geq n$ and having a non-zero coefficient.

3. The circuit of claim 1 wherein, in step b2), at least one of the sub-networks of XOR devices is configured such that in operation of the circuit, in response to a first clock cycle, that sub-network generates a signal that represents, for a first i, the XOR of $X^i$ and all $X^j$ determined in step b1) for the first i and, in response to a second clock cycle, that sub-network generates a signal that represents, for a second i, the XOR of $X^i$ and all $X^j$ determined in step b1) for the second i.

4. The circuit of claim 3, and further comprising:

a data selector associated with each of said at least one of the sub-networks of XOR devices, and that is connected to provide, in response to the first clock cycle, for the first i, $X^i$ and all $X^j$ determined in step b1) for the first i and, in response to a second clock cycle, for the second i, the XOR of $X^i$ and all $X^j$ determined in step b1) for the second i.

5. A method of testing the circuit of claim 1, including:

generating a first verification model for the circuit of claim 1, that generates a verified result, in less than i clock cycles, representative of the terms of the third binary polynomial;

generating a second verification model for a circuit that nominally generates a second verified result, identical to the first verified result, but in i clock cycles; and comparing the first result to the second result.

6. The method of claim 5, wherein the second formal verification model is a verification model of a linear feedback shift register circuit for generating the third binary polynomial.

7. The method of claim 5, wherein the first formal verification model generated is a CTL model.

8. The method of claim 5, wherein the second formal verification model generated is a CTL model.

9. The method of claim 5, wherein the comparing step is performed by a SMV formal verification framework.

10. A circuit that determines $H(X)=P(X) \bmod G(X)$, where $P(X)$ is a first binary polynomial, of a form $$a_m X^m + a_{m-1} X^{m-1} + \ldots + a_0,$$

where $a=\{0,1\}$ and $X=\{0,1\}$;

$G(X)$ is a second binary polynomial, of a form $$a_n X^n + a_{n-1} X^{n-1} + \ldots + a_0,$$

where $a=\{0,1\}$ and $X=\{0,1\}$, and m>n; and $H(X)$ is a third binary polynomial, of a form $b_p X^p + b_{p-1} X^{p-1} + \ldots + b_0$, the circuit comprising:

a network of XOR devices, the network having at least inputs for the coefficients $a_m \ldots a_0$ of the first binary polynomial and that generates the coefficients $b_p \ldots b_0$ in parallel with each other.

11. The circuit of claim 10, wherein each of at least a subset of the coefficients $b_p \ldots _0$ are characterized by a plurality of sub-coefficients, and the network includes a sub-network corresponding to each of the subset of coefficients, wherein, for each of the subset of coefficients, each sub-network, in parallel to each other sub-network, sequentially providing the sub-coefficients for that coefficient, the network further including circuitry that generates each of the subset of coefficients from the sub-coefficients sequentially provided by the sub-network corresponding to that coefficient.

12. The circuit of claim 11, wherein the network operates responsive to a clock, and wherein each sub-network provide each sub-coefficient, of the coefficient to which that sub-network corresponds, in a single clock cycle.

13. The circuit of claim 10, wherein the network operates responsive to a clock, and wherein the network provides the coefficients $b_p \ldots b_0$ in a single clock cycle.

14. A circuit including a network of XOR devices for generating a header error control field during transmission of digital data by computing the remainder polynomial of dividing a general 39-degree binary polynomial having the form $a_{39}X^{39}+a_{38}X^{38}+ \ldots +a_0$, by the polynomial $X^8+X^2+X+1$, to generate the coefficients of the remainder polynomial of the form $h_7X^7+h^6X^6+ \ldots +h_0$, including:

a seventh sub-network of XOR devices that generates $h_7$, the sub-network of XOR devices computing $h_7$ as follows:

$h_7 = (a_{13}$ xor $a_{14}$ xor $a_{15}$ xor $a_{19}$ xor $a_{21}$ xor $a_{23}$) xor ($a_{25}$ xor $a_{26}$ xor $a_{28}$ xor $a_{30}$ xor $a_{35}$ xor $a_{37}$ xor a38);

a sixth sub-network of XOR devices that generates $h_6$, the sub-network of XOR devices computing $h_6$ as follows:

$h_6 = (a_{12}$ xor $a_{13}$ xor $a_{14}$ xor $a_{18}$ xor $a_{20}$ xor $a_{22}$) xor ($a_{24}$ xor $a_{25}$ xor $a_{27}$ xor $a_{29}$ xor $a_{34}$ xor $a_{36}$ xor $a_{37}$);

a fifth sub-network of XOR devices that generates $h_5$, the sub-network of XOR devices computing $h_5$ as follows:

$h_5 = (a_{11}$ xor $a_{12}$ xor $a_{13}$ xor $a_{17}$ xor $a_{19}$ xor $a_{12}$, xor $a_{23}$) xor ($a_{24}$ xor $a_{26}$ xor $a_{28}$ xor $a_{33}$ xor $a_{35}$ xor $a_{36}$ xor $a_{39}$);

a fourth sub-network of XOR devices that generates $h_4$, the sub-network of XOR devices computing $h_4$ as follows:

$h_4 = (a_{10}$ xor $a_{11}$ xor $a_{12}$ xor $a_{16}$ xor $a_{18}$ xor $a_{20}$ xor $a_{22}$ xor $a_{23}$) xor ($a_{25}$ xor $a_{27}$ xor $a_{32}$ xor $a_{34}$ xor $a_{35}$ xor $a_{38}$ xor $a_{39}$);

a third sub-network of XOR devices that generates $h_3$, the sub-network of XOR devices computing $h_3$ as follows:

$h_3 = (a_9$ xor $a_{10}$ xor $a_{11}$ xor $a_{15}$ xor $a_{17}$ xor $a_{19}$ xor $a_{21}$ xor $a_{22}$) xor ($a_{24}$ xor $a_{26}$ xor $a_{31}$ xor $a_{33}$ xor $a_{34}$ xor $a_{37}$ xor $a_{38}$);

a second sub-network of XOR devices that generates $h_2$, the sub-network of XOR devices computing $h_2$ as follows:

$h_2 = (a_8$ xor $a_9$ xor $a_{10}$ xor $a_{14}$ xor $a_{16}$ xor $a_{18}$ xor $a_{20}$ xor $a_{21}$ xor $a_{23}$) xor ($a_{25}$ xor $a_{30}$ xor $a_{32}$ xor $a_{33}$ xor $a_{36}$ xor $a_{37}$);

a first sub-network of XOR devices that generates $h_1$, the sub-network of XOR devices computing $h_1$ as follows:

$h_1 = (a_8$ xor $a_9$ xor $a_{14}$ xor $a_{17}$ xor $a_{20}$ xor $a_{21}$ xor $a_{22}$ xor $a_{23}$ xor) xor ($a_{24}$ xor $a_{25}$ xor $a_{26}$ xor $a_{28}$ xor $a_{29}$ xor $a_{30}$ xor $a_{31}$ xor $a_{32}$ xor $a_{36}$ xor $a_{37}$ xor $a_{38}$); and a zeroth sub-network of XOR devices that generates $h_0$, the sub-network /of XOR devices computing ho as follows:

$h_0 = (a_8$ xor $a_{14}$ xor $a_{15}$ xor $a_{16}$ xor $a_{20}$ xor $a_{22}$) xor ($a_{24}$ xor $a_{26}$ xor $a_{27}$ xor $a_{29}$ xor $a_{31}$ xor $a_{36}$ xor $a_{38}$ xor $a_{39}$).

* * * * *

UNITED STATES PATENT AND TRADEMARK OFFICE
CERTIFICATE OF CORRECTION

PATENT NO.: 5,905,664
DATED: May 18, 1999
INVENTOR(S): Eugene Ko et al.

It is certified that errors appear in the above-identified patent and that said Letters Patent is hereby corrected as shown below:

In Col. 5, line 64, delete "an $X^{n-1}+...$" and replace with --$a_{n-1}X^{n-1}+...$--.

In Col. 8, line 3, delete the second occurrence of "$a_{12}$" and replace with --$a_{21}$--.

In Col. 8, line 24, delete "h," and replace with --$h_1$--.

In Col. 8, line 32, delete "/".

In Col. 8, line 32, delete "ho" and replace with --$h_0$--.

Signed and Sealed this

Twelfth Day of October, 1999

Attest:

Q. TODD DICKINSON

*Attesting Officer*     *Acting Commissioner of Patents and Trademarks*